(12) United States Patent
Duvenhage et al.

(10) Patent No.: US 10,086,366 B2
(45) Date of Patent: *Oct. 2, 2018

(54) PROMOTED, ATTRITION RESISTANT, SILICA SUPPORTED PRECIPITATED IRON CATALYST

(71) Applicant: RES USA, LLC, Westminster, CO (US)

(72) Inventors: Dawid J. Duvenhage, Evergreen, CO (US); Belma Demirel, Clarendon Hills, IL (US)

(73) Assignee: RES USA, LLC, Westminster, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/372,963

(22) Filed: Dec. 8, 2016

(65) Prior Publication Data

US 2017/0100708 A1 Apr. 13, 2017

Related U.S. Application Data

(60) Division of application No. 14/672,636, filed on Mar. 30, 2015, now Pat. No. 9,550,172, which is a continuation of application No. 12/207,859, filed on Sep. 10, 2008, now Pat. No. 9,018,128.

(Continued)

(51) Int. Cl.
*B01J 23/78* (2006.01)
*C10G 2/00* (2006.01)
(Continued)

(52) U.S. Cl.
CPC .............. *B01J 23/78* (2013.01); *B01J 21/08* (2013.01); *B01J 35/08* (2013.01); *B01J 37/031* (2013.01); *C10G 2/332* (2013.01)

(58) Field of Classification Search
None
See application file for complete search history.

(56) References Cited

U.S. PATENT DOCUMENTS 4,385,193 A   5/1983   Bijaard et al.
4,622,308 A   11/1986  Koikeda et al.
(Continued)

FOREIGN PATENT DOCUMENTS

CN    1395992 A     2/2003
WO    02/18043 A1   3/2002
WO    2006048421    5/2006

OTHER PUBLICATIONS

Byrappa, K. et al. Handbook of Hydrothermal Technology. William Andrw Publishing, LLC. Noyes Pubblications. NJ, NY (USA). (2001).

(Continued)

*Primary Examiner* — Sheng H Davis
(74) *Attorney, Agent, or Firm* — Timothy S. Westby; Porter Hedges LLP

(57) ABSTRACT

A structurally promoted precipitated catalyst containing crystalline silica, at least one chemical promoter selected from the group consisting of alkali metals, and iron, the structurally promoted precipitated catalyst comprising maghemite and hematite catalytic phases, and exhibiting a main reduction peak temperature, as determined by TPR, in the range of from about 210° C. to about 350° C. A method of producing the structurally promoted precipitated catalyst is also provided.

17 Claims, 3 Drawing Sheets

Related U.S. Application Data

(60) Provisional application No. 60/972,458, filed on Sep. 14, 2007.

(51) Int. Cl.
  *B01J 37/03* (2006.01)
  *B01J 21/08* (2006.01)
  *B01J 35/08* (2006.01)

(56) References Cited

U.S. PATENT DOCUMENTS

| | | | |
|---|---|---|---|
| 4,686,313 | A | 8/1987 | Bell et al. |
| 4,707,500 | A | 11/1987 | Hinnenkamp et al. |
| 5,504,118 | A | 4/1996 | Benham et al. |
| 5,677,254 | A | 10/1997 | Nojima et al. |
| 6,653,357 | B1 | 11/2003 | Espinoza et al. |
| 7,067,559 | B2 | 6/2006 | Bhatt et al. |
| 7,067,562 | B2 | 6/2006 | Espinoza et al. |
| 7,199,077 | B2 | 4/2007 | Hu et al. |
| 7,348,293 | B2 | 3/2008 | Timken |
| 7,811,967 | B2 | 10/2010 | Reynhout et al. |
| 2003/0017937 | A1 | 1/2003 | Ihm et al. |
| 2003/0203982 | A1 | 10/2003 | Davis et al. |
| 2004/0009871 | A1 | 1/2004 | Hu et al. |
| 2004/0106517 | A1 | 6/2004 | Diamini et al. |
| 2004/0122115 | A1 | 6/2004 | Espinoza et al. |
| 2004/0220437 | A1 | 11/2004 | Jothimurugesan et al. |
| 2004/0235966 | A1 | 11/2004 | Bhatt et al. |
| 2008/0039539 | A1 | 2/2008 | Espinoza et al. |

OTHER PUBLICATIONS

European Extended Search Report dated Feb. 2, 2015 for corresponding European Application No. EP 08829971.4-1352 (5 pgs.).
Canadian Office Action dated Aug. 26, 2011 for corresponding Canada Application No. 2699554 (3 pgs.).
Australian Office Action dated Feb. 25, 2013 for corresponding Australian Application No. 2008298924 (4 pgs.).
Australian Office Action dated Mar. 13, 2012 for corresponding Australian Application No. 2008298924 (3 pgs.).
Search Report and Written Opinion dated Mar. 19, 2009 for International Application No. PCT/US2008/075979 pgs.).
Notice of Allowance dated Feb. 12, 2015 for corresponding U.S. Appl. No. 12/207,859 (13 pgs.).
Chinese Office Action dated Dec. 24, 2012 for corresponding Chinese Application No. 200880107024.X (11 pgs.).
Chinese Office Action dated Jul. 17, 2012 for corresponding Chinese Application No. 200880107024.X (12 pgs.).
India Office Action dated Aug. 24, 2014 for corresponding India Application No. 2404/DELNP/2010 (2 pgs.).
New Zealand Office Action dated Nov. 23, 2010 for corresponding New Zealand Application No. 584226 (2 pgs.).
European Extended Search Report dated Nov. 25, 2011 for corresponding European Application No. EP (3 pgs.).
C. H. Zhang, et al., "Study of an Iron-Manganese Fischer-Tropsch Synthesis Catalyst Promoted with Copper," of Catalysts, Academic Press, Duluth, MN, US, vol. 237, No. 2, Jan. 25, 2006, pp. 405-415 (15 pgs.).
Mark E. Dry, "The Fischer-Tropsch Process—Commercial Aspects," Catalysis Today, vol. 6, No. 3, Jan. 1 pp. 183-206 (24 pgs.).
Office Action dated Feb. 9, 2010 for corresponding U.S. Appl. No. 12/207,859 (13 pgs.).
Office Action dated Jul. 22, 2010 for corresponding U.S. Appl. No. 12/207,859 (18 pgs.).
Office Action dated Dec. 28, 2010 for corresponding U.S. Appl. No. 12/207,859 (17 pgs.).
Office Action dated May 26, 2011 for corresponding U.S. Appl. No. 12/207,859 (19 pgs.).
Office Action dated Oct. 10, 2013 for corresponding U.S. Appl. No. 12/207,859 (18 pgs.).
Office Action dated Apr. 10, 2014 for corresponding U.S. Appl. No. 12/207,859 (19 pgs.).
Office Action dated Jul. 1, 2014 for corresponding U.S. Appl. No. 12/207,859 (16 pgs.).
Chinese Office Action dated Jul. 3, 2017 for corresponding patent application No. 201510296793.0, (8 pgs.).
European Examination Report dated Jun. 29, 2017 for corresponding patent application No. 08829971.4, (3 pgs.).
Office Action dated Jan. 26, 2018 for corresponding Chinese Patent Application No. 201510296793.0 and English translation, 23 pages.

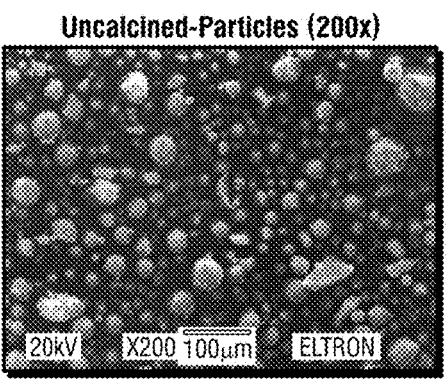
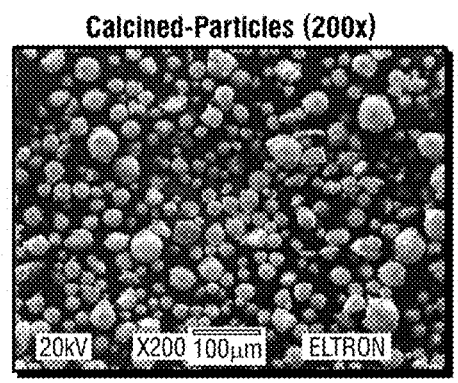
FIG. 2A    FIG. 2B
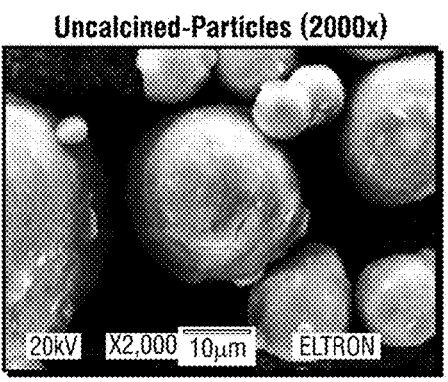
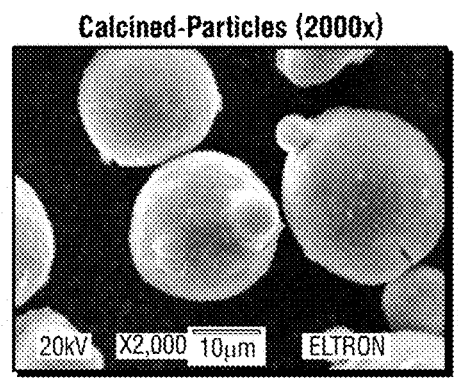
FIG. 2C    FIG. 2D

PROMOTED, ATTRITION RESISTANT, SILICA SUPPORTED PRECIPITATED IRON CATALYST

CROSS-REFERENCE TO RELATED APPLICATIONS

This application is a divisional application of U.S. application Ser. No. 14/672,636 filed on Mar. 30, 2015, which is a continuation application of U.S. application Ser. No. 12/207,859 filed on Sep. 10, 2008, which application claims the benefit under 35 U.S.C. § 119(e) of U.S. Provisional Patent Application No. 60/972,458 filed Sep. 14, 2007, the disclosures of each of which are hereby incorporated herein by reference.

STATEMENT REGARDING FEDERALLY SPONSORED RESEARCH OR DEVELOPMENT

Not applicable.

BACKGROUND

Field of the Invention

This invention relates generally to the field of synthetic liquid hydrocarbon catalysis. More specifically, the invention relates to a catalyst support solution comprising crystalline silica which may be used to form an attrition resistant precipitated Fischer-Tropsch catalyst.

Background of Invention

Fischer-Tropsch (FT) synthesis represents a catalytic method for the creation of synthetic liquid fuels. The reaction occurs by the metal catalysis of an exothermic reaction between carbon monoxide and hydrogen gas mixtures, called synthesis gas, or syngas. The liquid product of the reaction is refined to produce a range of synthetic fuels, lubricants and waxes. The primary metals utilized as catalysts are cobalt and iron. The latter is favored due to a significantly lower cost. The quantity of catalyst available for catalysis in the reactor dictates the reaction product synthesized. Large scale Fischer-Tropsch reactors utilize complex systems to maintain nearly static quantities of catalyst within the reactor as a means to produce a constant output of product. Attrition, the degradation of the catalyst structure, is a major hurdle in improving FT reactor efficiency.

Breakage of catalyst structure is mainly attributed to two causes, being physical and chemical attrition. Chemical attrition is associated with structural changes during chemical transformation within the catalyst—typically active phase transition from iron oxide to iron metal to iron carbide. Physical breakup is mainly contributed to the rubbing and collision of the catalyst particles, resulting in micron fine material (fines); very much like rocks in a stream, milling against each other to form edge free pebbles.

The physical integrity of unsupported precipitated iron catalyst suffers during slurry phase Fischer-Tropsch synthesis, degrading product quality (solids and iron content in wax) to such an extent that the run may have to be compromised or terminated. Other impacts may be on the wax upgrading, for example hydrogenation system, which is sensitive to the presence of iron in the feed stock. These negative impacts reduce time online for a reactor and increase costs for filtering product, maintaining the reactor, and overall production.

Several research studies indicate that silica incorporation during, or after precipitation, may lead to catalyst with superior structural properties. However, to create smooth round particles, precipitated catalyst must be prepared by spray drying. Little is published on the subject of catalyst spray drying procedures and conditions. What is available indicates the principle spray drying parameter to successful large, stable round particles, relates to increased particle density. While several spray dryer parameters are associated with the quality of the material spray dried, the main common parameters to establish dense particles are higher solids content in the feed, few soluble species, and slower drying through lower gas temperatures.

Apart from attributing structural integrity, the silica is also thought to assist in creating smooth round catalyst particles that will be subject to minimum attrition. The silica content is however found to have a profound impact on mean particle size, i.e. decreasing as the silica content increases. Hence, the spray drying parameters have to be redefined, and optimized, for each change in catalyst composition. Traditionally silica is added to the catalyst as a structural support. Unsupported catalyst has the tendency to sinter during Fischer-Tropsch synthesis. Reduced iron entities are very mobile, and in the absence of a structural support will coalesce to form bigger entities, which results in a loss of surface area, and consequently leads to a loss in activity.

Consequently, there is a need for a silica support solution which may be used with a precipitated iron catalyst to increase attrition resistance of particles formed therefrom and utilized in a Fischer-Tropsch conversion process.

SUMMARY

Herein disclosed is a structurally promoted precipitated catalyst comprising: crystalline silica; at least one chemical promoter selected from the group consisting of alkali metals; and iron; wherein the structurally promoted precipitated catalyst comprises maghemite and hematite catalytic phases, and wherein the structurally promoted precipitated catalyst has a main reduction peak temperature, as determined by TPR, in the range of from about 210° C. to about 350° C. The structurally promoted precipitated catalyst may comprise a substantially homogeneous distribution of iron and alkali metal due to production thereof via impregnation of a precipitated iron catalyst slurry with an alkali-silicate support solution comprising: crystalline silica dissolved in an aqueous solution comprising at least one chemical promoter selected from the group consisting of alkali metal bases. In embodiments, the alkali-silicate support solution has a pH of greater than or equal to about 7.

In embodiments, the chemical promoter comprises an alkali hydroxide. The chemical promoter may be selected from the group consisting of sodium hydroxide, potassium hydroxide, and combinations thereof. In embodiments, the chemical promoter comprises potassium hydroxide.

The alkali-silicate support solution further may further comprise a structural support selected from the group consisting of boehmite, amorphous silica, silicic acid, tetraethyl orthosilicate, alumina, $MgAl_2O_4$ and combinations thereof. The alkali-silicate support solution may comprise no significant concentration of salt.

In embodiments, the structurally promoted precipitated catalyst comprises $SiO_2$:Fe in a weight ratio of from about 2:100 to about 24:100. in embodiments, the structurally promoted precipitated catalyst further comprises copper. The structurally promoted precipitated catalyst may comprise a weight ratio of Cu:Fe in the range of from 1:100 to about 10:100. In embodiments, the structurally promoted precipitated catalyst comprises K:Fe in a weight ratio of from about 1:100 to about 10:100.

In embodiments, the structurally promoted precipitated catalyst exhibits an ASTM air jet attrition resistance such that less than about 5 wt % fines are produced within a testing duration of 5 hours. In embodiments, the structurally promoted precipitated catalyst produces less than 1 wt % fines within a testing duration of 5 hours.

The structurally promoted precipitated catalyst may be a Fischer-Tropsch catalyst that catalyzes Fischer-Tropsch synthesis. The structurally promoted precipitated catalyst may exhibit a main reduction peak temperature, as determined by TPR, in the range of from about 210° C. to about ° C. The structurally promoted precipitated catalyst may comprise substantially no iron silicates. In embodiments, the structurally promoted precipitated catalyst exhibits substantially equivalent x-ray diffraction peaks for maghemite and hematite.

Also disclosed herein is a method of producing a structurally promoted precipitated iron catalyst, the method comprising: dissolving crystalline silica in an aqueous solution comprising water and at least one chemical promoter selected from the group consisting of alkali metal bases, thus forming an alkali-silicate support solution; effecting double promotion of a precipitated iron catalyst slurry by combining the alkali-silicate support solution with the precipitated iron catalyst slurry to form an attrition resistant catalyst slurry; and drying the attrition resistant catalyst slurry to yield the structurally promoted precipitated iron catalyst. In embodiments, the alkali-silicate support solution comprises no significant concentration of salt. The structural support may further comprise a support selected from boehmite, amorphous silica, silicic acid, tetraethyl orthosilicate, alumina, $MgAl_2O_4$, activated carbon, zirconium oxide and combinations thereof.

In embodiments, the chemical promoter comprises alkali hydroxide. In embodiments, the chemical promoter comprises potassium hydroxide. The method may further comprise stirring the alkali-silicate support solution at 100° C. prior to combination thereof with the precipitated iron catalyst slurry. In embodiments, the attrition resistant catalyst slurry is dried at a temperature of from about 80° C. to about 100° C. The method may further comprise calcining the structurally promoted precipitated iron catalyst at a temperature of from about 300° C. to about 380° C. The catalyst may be heated at a temperature less than the calcination temperature prior to calcination. In embodiments, the method comprises calcining the structurally promoted precipitated iron catalyst at a temperature of from about 300° C. to about 320° C.

In embodiments, jet attrition resistance testing of the structurally promoted precipitated iron catalyst yields less than 7% fines after 5 hours. In embodiments, jet attrition resistance testing of the structurally promoted precipitated iron catalyst yields less than 5% fines after 5 hours. In embodiments, jet attrition resistance testing of the structurally promoted precipitated iron catalyst yields substantially no fines after 5 hours of testing.

In embodiments, the structurally promoted precipitated iron catalyst has a main reduction peak temperature, as determined by TPR, in the range of from about 210° C. to about 350° C. The structurally promoted precipitated iron catalyst may exhibit a main reduction peak temperature of less than 240° C. The structurally promoted precipitated iron catalyst may comprise $SiO_2$:Fe in a weight ratio of from about 2:100 to about 24:100. In embodiments, the structurally promoted precipitated iron catalyst comprises $SiO_2$:Fe in a weight ratio of from about 6:100 to about 12:100. The structurally promoted precipitated iron catalyst may comprise K:Fe in a weight ratio of from about 1:100 to about 10:100.

Also disclosed herein is a method of producing a structurally promoted precipitated iron catalyst, the method comprising: dissolving crystalline silica in an aqueous solution comprising water, a peptizing agent, and at least one chemical promoter selected from the group consisting of alkali metal bases, thus forming an alkali-silicate support solution; effecting double promotion of a precipitated iron catalyst slurry by combining the alkali-silicate support solution with the precipitated iron catalyst slurry to form an attrition resistant catalyst slurry; and drying the attrition resistant catalyst slurry to yield the structurally promoted precipitated iron catalyst. The peptizing agent may be selected from the group consisting of nitric acid, acetic acid, ammonium hydroxide, and combinations thereof. The method may comprise effecting precipitation of the precipitated iron catalyst slurry via carbonate precipitation. The method may comprise effecting precipitation of the precipitated iron catalyst slurry via hydroxide precipitation.

The foregoing has outlined rather broadly the features and technical advantages of the invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other structures for carrying out the same purposes of the invention. It should also be realized by those skilled in the art that such equivalent constructions do not depart from the spirit and scope of the invention as set forth in the appended claims.

BRIEF DESCRIPTION OF THE DRAWINGS

For a detailed description of the preferred embodiments of the invention, reference will now be made to the accompanying drawings in which:

FIG. 2A shows surface morphology of uncalcined RI-DD-16 IARC particles at 200 times magnification.

FIG. 2B shows surface morphology of calcined RI-DD-16 IARC particles at 200 times magnification.

FIG. 2C shows surface morphology of uncalcined RI-DD-16 IARC particles at 2000 times magnification.

FIG. 2D shows surface morphology of calcined RI-DD-16 IARC particles at 2000 times magnification.

NOTATION AND NOMENCLATURE

Figure 1A:
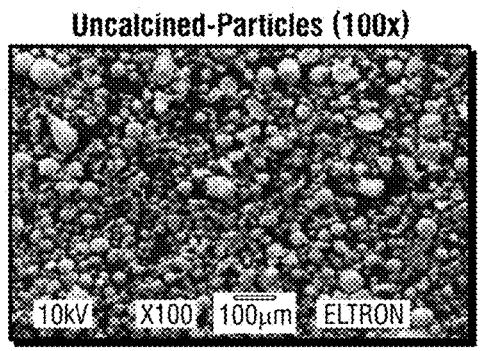
FIG. 1A shows surface morphology of uncalcined IARC FeKSi-2 at 100 times magnification.
Figure 1B:
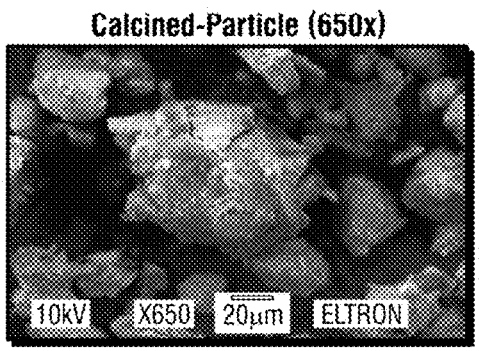
FIG. 1B shows surface morphology of calcined IARC FeKSi-2 at 650 times magnification.
Figure 1C:
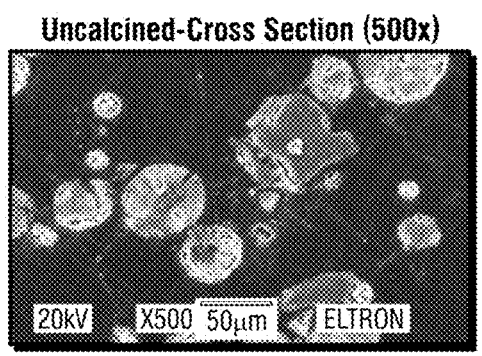
FIG. 1C shows cross section of uncalcined IARC particles of FeKSi-2 at 500 times magnification.
Figure 1D:
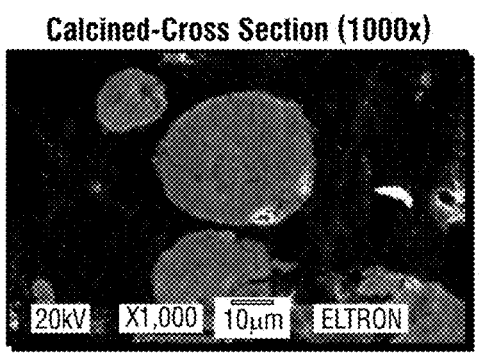
FIG. 1D shows cross section of calcined IARC particles of FeKSi-2 at 1000 times magnification.

Certain terms are used throughout the following description and claims to refer to particular system components. This document does not intend to distinguish between components that differ in name but not function.

DETAILED DESCRIPTION

Herein disclosed is a support solution and a method for making same, the support solution suitable for forming an attrition resistant precipitated iron catalyst. When incorporated into a Fischer-Tropsch (FT) catalyst, the support solution is capable of insuring long term catalyst stability and integrity during slurry bed operation. The support solution may be used to produce a "structurally promoted" FT catalyst, e.g. a precipitated iron catalyst, having reduced tendency to sinter when compared to unsupported precipitated FT catalyst. Attrition is the deterioration, degradation, break down or deconstruction of a particle. Sintering, as defined here in, is the process of adhesion, coalescence, aggregation, or combination of multiple catalyst particles to form a larger entity.

In embodiments, the support solution comprises at least one structural support/promoter and at least one chemical promoter. In embodiments, the herein disclosed method for forming a support solution prepares promotional species from dissolved silica or alumina. The method employs double promotion, i.e. employing double promotion in a one step process, i.e. adding structural promoter (e.g. $SiO_2$ or $Al_2O_3$), and chemical promoter (e.g. K added as KOH) in one step. In embodiments, the support solution further comprises controlled quantities of water.

The support solution comprises at least one structural support/promoter. The at least one structural promoter is selected from the group consisting of crystalline silica, alumina, boehmite, amorphous (e.g. fumed) silica, and combinations thereof. In some embodiments, the structural promoter is selected from alumina, silica, silicic acid, activated carbon, zirconium oxide, and combinations thereof. In preferred embodiments, the structural promoter comprises crystalline silica or mixtures of crystalline silica and silicic acid. In embodiments the support solution comprises more than one structural support/promoter. For example, in embodiments, the support solution comprises crystalline silica with at least one structural support/promoter selected from the group consisting of boehmite, fumed silica, alumina, $MgAl_2O_4$, activated carbon, zirconium oxide and combinations thereof.

In embodiments, the support solution is formed by forming a suspension of structural support/promoter in a solution of chemical promoter. In embodiments, water is added to the chemical promoter solution and/or to the structural support/promoter. In embodiments, the water is distilled water. In embodiments, water is added to create a stirrable slurry of the at least one structural support/promoter. In embodiments, the at least one structural support/promoter or the at least one structural support/promoter and water is mixed for a time of from about 5 minutes to about 24 hours. In embodiments, the at least one structural support/promoter or the at least one structural support/promoter and water is mixed for a time of from about 5 minutes to about 10 minutes prior to being added to the at least one chemical promoter.

The support solution comprises at least one chemical promoter. In embodiments, the at least one chemical promoter comprises a highly alkaline base. In some embodiments, the chemical promoter comprises a hydroxide of an alkali metal. In embodiments, the base is selected from the group consisting of potassium hydroxide, sodium hydroxide, ammonium hydroxide, and combinations thereof.

In embodiments, the alkali hydroxide comprises KOH, NaOH, or a combination thereof. In embodiments, after water and structural support/promoter are well mixed, the mixture is added to potassium hydroxide (e.g. KOH, 45 wt %). In preferred embodiments, the support solution is created by co-mixing potassium hydroxide (KOH) and crystalline silica (e.g. SIL-CO-SIL-75 from U.S. Silica Company). In embodiments, an aqueous solution of structural support/promoter is added to chemical promoter solution and stirred for a time of from about 5 minutes to about 24 hours. In some embodiments, an aqueous solution of structural support/promoter is added to chemical promoter solution and stirred for a time of from about 5 minutes to about 10 minutes. In embodiments, an aqueous solution of structural support/promoter is added to chemical promoter solution and stirred for a time of from about 10 minutes to about 20 minutes. In embodiments, the stirring is performed at substantially room temperature. In embodiments, the stirring is performed while heating. In embodiments, the stirring is at a temperature of about 40° C. In embodiments, the stirring is at a temperature of from about 50° C. to about 100° C.

In some embodiments, water is substituted for an acid or alternative base. In embodiments, the support solution comprises an alkali-silicate solution. In embodiments, depending on the moisture content, the support solution comprises an alkali-silicate-hydrate gel (the $OH^-$ as well as the pH decreases as the silica dissolves). The support solution may comprise a mixture, a suspension, or a colloid.

In embodiments, the dissolution of structural support/promoter (e.g. $SiO_2$) is enhanced by adding the structural support/promoter slowly, in small portions, to the chemical promoter, e.g. KOH, solution. In these embodiments, whenever a portion of structural support/promoter (e.g., silica) has "dissolved" into the chemical promoter, the next portion is added.

In embodiments, the support solution has a pH in the range of from about 6 to about 14. In embodiments, the support solution has a pH of from about 7 to about 14. In embodiments, the pH of the support solution is less than 10.5. In embodiments, the pH of the support solution is greater than 10. Without wishing to be limited by theory, above pH of 6/7, and up to pH 10.5 (where silica begins to dissolve as silicate=Si), silica particles are negatively charged and repulse each other. The particles thus do not collide and particle growth continues without aggregation. Salt should be excluded from the support solution, as the presence of salt would reduce the charge repulsion and aggregation/gelling may occur. In embodiments, the support solution does not comprise a significant concentration of salt. At lower pH values, silica particles bear little ionic charge and may undesirably collide and aggregate into chains and then gel networks. In embodiments, an acid is added to adjust the pH of the support solution. In some embodiments, nitric acid is added to adjust the pH into the range of from about 6/7 to about 14.

In embodiments, the support solution is prepared at room temperature. In embodiments, the support solution is prepared at temperature to facilitate dissolution. In embodiments, the support solution is prepared at a temperature of from about 45° C. to about 50° C. In embodiments, the support solution is prepared at a temperature of from about 75° C. to about 95° C.

In embodiments, the support solution further comprises a peptizing agent. In embodiments, the peptizing agent is selected from nitric acid, acetic acid, ammonium hydroxide, aqueous solutions thereof, and combinations thereof. In embodiments, the support solution comprises a lyophobic sol, which is dispersed to reduce a mass to colloidal size or colloidal particles built from molecules via condensation. In both cases, a peptizing agent may be added to stabilize the sol. This agent can supply ions that will be adsorbed on the particles resulting from dispersion or condensation to give them a stabilizing charge. In embodiments, the peptizing agent comprises $OH^-$ ion, which may be supplied by alkalis. In embodiments, the structural support/promoter comprises alumina. In embodiments, the structural support/promoter comprises alumina and the support solution comprises a dispersion or sol comprising water, alumina (e.g. boehmite), and optionally peptizing agent (e.g., an acid such as nitric acid). In embodiments, the peptizing agent comprises acetic acid.

In embodiments, the structural support/promoter is carefully added to chemical promoter solution over a time of from about 5 minutes to about 24 hours. On addition of the final portion of structural support/promoter, the mixture may thicken to an unstirrable paste. In these embodiments, the consistency of the final support solution may be slightly adjusted with distilled water to reslurry the mixture and then stirred for a time. This time may be from about 5 minutes to about 24 hours.

In embodiments, preparation of the support solution allows for an extended structural support/promoter dissolution period. In some embodiments, the mixture is stirred overnight.

In embodiments, following addition of alkali hydroxide solution, the support solution is heated. In embodiments, the support solution is heated to a mild temperature. In embodiments, the support solution is not heated, but immediately added to a precipitated catalyst slurry. For example, in embodiments, the support solution is added to an iron hydroxide slurry. In alternative embodiments, after addition of the chemical promoter, the support solution is heated and then added to a catalyst slurry. In specific embodiments, the support solution is heated to a temperature of from about 40° C. to about 60° C. In embodiments, the support solution is heated to a temperature of about 45° C. overnight. Without wishing to be limited by theory, it is postulated that this heating may increase the rate of structural support/promoter (e.g. silica) dissolution. In embodiments, the support solution is mixed and heated at a temperature of between 40° C. and about 70° C. In alternative embodiments, the alkali-silica solution may be oven dried at 100° C. overnight.

In embodiments, the heated support solution is added to an iron hydroxide slurry comprising iron hydroxide precipitate. In embodiments, an alkali-silica support solution is diluted into an iron hydroxide slurry. In the disclosed method, the chemical promoter (typically potassium) and structural promoter(s) (typically silica and/or alumina) are added in one step to the precipitated catalyst (e.g. iron) slurry.

In embodiments, the attrition resistant catalyst slurry (ARCS) comprises weight ratios of chemical promoter alkali metal to catalyst metal in the weight ratio of from 1:100 to 10:100. In embodiments, the chemical promoter alkali metal to catalyst metal is in a weight ratio of about 2.5:100 to about 5:100. In embodiments, the weight ratio of structural support/promoter to catalyst metal is in the range of from about 2:100 to about 24:100. In embodiments, the weight ratio of structural support/promoter to catalyst metal is in the range of from about 6:100 to about 24:100. In specific embodiments, the catalyst slurry comprises 2.5 or 5 K to 100 Fe; and 6, 12 or 24 $SiO_2$ to 100Fe. In alternative embodiments, the catalyst slurry comprises 2.5 or 5 K to 100 Fe; and 6, 12 or 24 $Al_2O_3$ to 100Fe. In embodiments, the catalyst also comprises copper in a weight ratio with catalyst metal of from 1:100 to about 10:100. In some embodiments, the catalyst slurry comprises copper in a similar weight ratio to iron as the ratio of chemical promoter alkali metal to catalyst metal, i.e. Cu:100Fe is about the same as chemical promoter:100Fe (e.g. K:100Fe). In embodiments, the catalyst metal comprises iron, cobalt, or a combination thereof. In some embodiments, the catalyst slurry comprises copper in a dissimilar weight ratio to iron as the ratio of chemical promoter alkali metal to catalyst metal.

In embodiments, the support solution comprises alkali-silica and is added into iron slurries, thereby transferring "strength" properties to the catalyst matrix once diluted into the iron hydroxide slurry. In embodiments, precipitated iron catalyst is impregnated with alkali-silica solution. In embodiments, the precipitated iron solution comprises an unsupported hydroxide (e.g. sodium hydroxide or ammonium hydroxide) precipitated catalyst solution. In embodiments, the precipitated iron solution comprises carbonate (e.g. sodium carbonate) precipitant. When combining a carbonate precipitated system with the potassium silicate support, the resulting IARCs may have a higher BET surface area when compared to hydroxide-precipitated catalyst.

In embodiments the iron slurry to be impregnated has a pH higher than 7, and more specifically higher than 10, and more specifically higher than 12. In embodiments, the iron slurry to be impregnated has a pH about neutral. In embodiments, upon the addition of the support solution to the iron catalyst slurry, the catalyst pH is readjusted to about neutral after addition of the support solution. In embodiments, upon the addition of the support solution to the iron catalyst slurry, the catalyst pH is not adjusted to about neutral after addition of the support solution. In embodiments, addition of alkali-silica solution does not negatively influence the catalytic behavior (activation, activity, selectivity). Without wishing to be limited by theory, it is believed that the silicate in "some way" forms a strong interaction with the iron oxide of the precipitated iron catalyst and that this bond strength is transferred to the activated iron (e.g. iron carbide or iron oxide) species.

In embodiments, iron silicates, $Fe_2SiO_4$ which are very difficult to reduce (reducible at temperatures greater than 700° C.) are not formed by the disclosed method. In embodiments, the IARCs are reducible at temperatures of less than about 272° C. In embodiments, the IARCs are reducible at temperatures of from about 210° C. to 350° C. In embodiments, the IARCs are reducible at temperatures of from about 210° C. to 280° C. In embodiments, the IARCs are reducible at temperatures of from about 210° C. to 240° C.

In embodiments, the ARCS is dried by any means known to those of skill in the art. In embodiments, uncalcined catalyst particles are dried by heating at 100° C. In embodiments, the ARCS is spray dried. Methods known to those of skill in the art may be used to spray dry improved attrition resistance catalyst particles (IARCs). For example, a Niro dryer may be used to perform spray drying. Spray drying as defined herein, is the process of drying a liquid feed through a hot gas. In embodiments the ARCS fed to the spray dryer is a solution, a colloid, or a suspension. In embodiments, the spray dried catalyst particles are smooth substantially round (or spherical) catalyst particles. In embodiments, the spray dried catalyst particles are rough and/or non spherical, catalyst particles. Smooth, round particles are desirable because such particles inhibit catalyst attrition due to increased particle density. Apart from contributing structural integrity, the presence of structural support/promoter (e.g. silica) in iron slurries may assist in spraying smooth round catalyst particles. The density of sprayed particles depends upon the solids content of the feed to be spray dried. In embodiments, the catalyst slurry has a solids content of from about 10% to about 20%. In embodiments, the catalyst slurry has a solids content of from about 0.5% to about 12.5%.

In embodiments, the spray dryer temperature is controlled at a temperature of from 90° C. to about 110° C. In embodiments, the spray dryer temperature is controlled at a temperature of from 95° C. to about 100° C. In some embodiments, the spray dryer temperature is controlled at a temperature of from about 104° C. to about 108° C. In embodiments, the spray dried particles have a Gaussian type particle size distribution (PSD). In embodiments, the mean particles size is in the range of from about 30 to about 90 µm. In embodiments, the mean particle size is in the range of from about 38 µm to about 80 µm. In embodiments, the mean particles size is in the range of from about 36 µm to about 48 µm.

It is believed that the silica assists in creating smooth round catalyst particles that will be subject to minimum attrition. As silica content has an impact on mean particle size, in embodiments, spray drying parameters are redefined, and optimized, for each change in catalyst composition to yield IARCs of a desired size.

In embodiments, the precipitated particles are stabilized (prestabilized) by heating to a temperature lower than the calcination temperature prior to calcination. In embodiments, the IARCs are prestabilized at a temperature below the temperature at which phase related changes/structuring take place [this may, for example, be determined by differential temperature analysis (DTA) over a temperature range, for example room temperature (RT) to about 550° C.].

In embodiments, the IARCs are prestabilized at a temperature below this phase change temperature prior to calcination. It is proposed that the Si—O—Si—K species introduced into the iron slurry undergoes dramatic restructuring on drying. In embodiments, water is used sparingly to inhibit shrinking of the catalyst on drying. In embodiments, a step wise increase in calcination temperature is used to prevent/minimize reduction in surface area. For instance, in embodiments, the catalyst is prestabilized by heating at a low temperature prior to calcination. In embodiments, the catalyst is prestabilized at a temperature of from about 100° C. to about 150° C. In embodiments, the catalyst is prestabilized at a temperature of from about 120° C. to about 150° C. In embodiments, the catalyst is prestabilized overnight, before increasing to full calcination conditions, to set the catalyst structure. Without wishing to be limited by theory, prestabilizing the precipitated catalyst system at a lower temperature prior to calcination may only result in a loss of micropores upon calcining, resulting in improved catalyst surface area.

In embodiments, the IARCs are calcined. In embodiments, improved attrition resistance particles (IARC) are calcined at a temperature of from about 200° C. to about 400° C. In embodiments, improved attrition resistance particles (IARC) are calcined at a temperature of from about 300° C. to about 380° C. In embodiments, improved attrition resistance particles (IARC) are calcined at a temperature of about 300° C. In embodiments, improved attrition resistance particles (IARC) are calcined at a temperature of about 320° C. In embodiments, improved attrition resistance particles (IARC) are calcined at a temperature of about 380° C. In embodiments, the IARCs are calcined by heating to a temperature of 380° C. by heating at a rate of 30° C. per minute and calcined for 4 hours. In embodiments, the IARCs are calcined by heating to a temperature of 380° C. by heating at a rate of 1° C. per minute and calcined for 4 hours. In embodiments, the IARCs are calcined by heating to a temperature of 300° C. by heating at a rate of from about 0.5° C. per minute to about 2° C. per minute. The IARCs may be calcined at the calcination temperature for about 4 hours. In embodiments, the IARCs are calcined by heating to a temperature of 300° C. by heating at a rate of 1° C. per minute and calcined for 4 hours. In embodiments, the IARCs are calcined in an oven, in atmosphere.

In specific embodiments the catalyst is prestabilized at 140° C. for 4 hours, the temperature is increased at a rate of from 0.5° C./min to about 2° C./min. to a temperature of greater than about 200° C. and the IARC calcined for 4 hours, the temperature is then increased at a rate of from about 0.5° C./min to about 2° C./min, and the IARCs are calcined at 300° C. for 4 hours. In some embodiments, the IARC is calcined at a temperature of about 320° C. for a period of about 4 hours. In certain embodiments, the IARC is calcined at a temperature of about 350° C. for a period of about 4 hours. In other embodiments, the IARC is calcined at a temperature of about 380° C. for a period of about 4 hours.

In embodiments, the IARC catalyst has improved attrition resistance when compared to conventional precipitated unsupported FT catalyst. In embodiments, uncalcined IARC catalyst (dried at 100° C.) shows no attrition deterioration after 5 hours of an ASTM Air Jet Attrition evaluation. This test is probably harsh compared to the actual flow dynamics of a slurry bed reactor. Thus, the air jet attrition is a much accelerated attrition. In embodiments, following calcination, the IARC catalyst produces from about 2.7% to about 6.3% fines after 5 hour air jet study. In embodiments, after 5 hours air jet break up study, the IARCs of the present disclosure produce less than 7% fines. In embodiments, after 5 hours air jet break up study, the IARCs of the present disclosure produce less than about 6% fines. In embodiments, after 5 hours air jet break up study, the IARCs of the present disclosure produce less than about 4% fines.

IARCs may also be examined using a modified attrition test, or RCA. For this test, a small quantity of activated catalyst is placed in oil in a vertical stainless steel column. Nitrogen or air is bubbled up through the column at a specified velocity. The column operates at atmospheric pressure and ambient temperature. Small samples are taken from the column at specified time intervals and analyzed for particle size distribution. The results for a test catalyst are usually compared to results for a control catalyst. The IARCs may exhibit reduced production of fines when subjected to the RCA.

In embodiments, the performance of IARC does not significantly deviate from conventional catalyst performance (activity, selectivity, and life online). In embodiments, the IARC catalyst produces a similar or increased quantity of C5+ hydrocarbons per hour per kg catalyst relative to a precipitated unsupported catalyst.

In embodiments, the uncalcined inventive catalyst has a BET surface area of from about 140 to about 250 m²/g. In embodiments, the uncalcined inventive catalyst has a BET surface area of from about 144 to 237 m²/g. In embodiments, the calcined IARC catalyst has a BET surface area of between about 50 and 150 m²/g. In embodiments, the calcined IARC catalyst has a BET surface area of between about 51 and 71 m²/g. In embodiments, the calcined catalyst has a BET surface area greater than 70 m²/g.

In embodiments, the pore volume for the supported IARC catalyst is greater than 0.20 cc/g. In embodiments, the pore size for the supported catalyst is in the range of from about 50 Å to about 100 Å. In embodiments, the pore size for the supported catalyst is in the range of from about 50 Å to about 78 Å.

In embodiments, the IARCs are activated as known to those of skill in the art and/or used in FT conversion of syngas to hydrocarbons. In embodiments, the catalyst is activated in hydrogen.

EXAMPLES

Example 1: Recipes 1-5

Support structures were formed using three procedures, referred to as Recipes 1, 2, 3, 4 and 5, respectively. For Recipe 1, a suspension of crystalline silica (SIL-CO-SIL-75 from the US Silica Company—Mean PSD of 25 micron) in distilled water was created, whereafter 45 wt. % KOH (Aldrich) was added to create either a 2.5 or 5 K/100 Fe and 6, 12 or 24 $SiO_2$/100Fe system. After addition of the KOH the mixture was heated to 45° C. and then added to the iron hydroxide slurry. A preparation of a support only material (i.e. not a catalyst) Recipe 1 was a "rock hard" cement-like material. The support, at 100° C., dried to a dense ceramic-like mass and was difficult to break or chalk with a sharp object. The material was smooth/not very porous. For example, SupSi-12 was formed by Recipe 1 by mixing 10 grams SIL-CO-SIL-75 silica and 6 grams DI water for 5 minutes. A quantity of 4 grams KOH (45 wt. %) was added and mixed for 5 min. The solution was heated to 45° C. and mixed for 15 min. The support solution was dried in oven at 100° C. overnight. The final product was rock hard. For spray drying according to Recipe 1, SupSi-19, 104 grams SIL-CO-SIL-75, 32.5 grams KOH (445 wt. %), and 6 grams DI water were used to prepare a slurry as per SupSi-12. The mixture had a water-like consistency. The solution was spray dried to particles (egg shell fragments-like) with smooth Bell curve PSD profile, and a mean particle size of 78 micron.

Recipe 2 (SupSi-15) was an adjustment of Recipe 1, to improve the $SiO_2$ dissolution. Here silica was being added slowly, in small portions, to the KOH solution. Whenever a portion of silica had "dissolved" into the KOH the next portion was added. On addition of the final portion of silica the mixture normally thickened to an unstirrable paste. A small quantity of distilled water was added to reslurry the mixture. In Recipe 2, the mixture was not heated, but immediately added to the iron hydroxide slurry once prepared.

Specifically, for SupSi-15 prepared via Recipe 2, 20 grams SIL-CO-SIL-75 silica was dissolved carefully portion-by-portion in to 8 grams KOH (45 wt. %) while mixing. The ratio of Si/K=4.6. On final addition of silica the mixture thickened. A quantity of 1 gram DI water was added to reslurry. The solution was mixed for approximately 15 minutes. The solution was dried in oven at 100° C. overnight. The product was a soft wax-like material. Upon calcination at 380° C. for 4 hours, the final product was rock hard.

Recipe 3 (SupSi-18) was created. Again, as described in Recipe 2, silica was carefully added to KOH. The final mixture consistency was slightly adjusted with distilled water so it could be stirred overnight with a magnetic stirrer. The resulting K—Si support mixture was added to the iron hydroxide precipitate.

Specifically, SupSi-18 was formed via Recipe 3 by dissolving 70 grams (of a total 104 grams) SIL-CO-SIL-75 silica portion-by-portion into 32.5 grams KOH (45 wt. %) and mixing. On adding the final portion the mixture thickens. A quantity of 10 grams DI water was added to reslurry the mixture. Next, the remaining 34 grams of silica were dissolved slowly, portion-by-portion in to the mixture, mixing. The mixture thickened again. A quantity of 5 grams of DI water was added. At this point, the pH was about 14.0 (pH paper). The solution was stirred overnight at room temperature. The mixture was viscous. Next, the solution was spray dried to spherical particles with smooth Bell curve PSD profile and a mean particle size of 109 micron.

Recipe 4 is as follows: Silicic acid is dissolved in ammonium hydroxide. This solution is added to a suitable amount of KOH and stirred until the solution is clear, an indication of substantially complete dissolution. Crystalline silica is portion by portion dissolved in the aforementioned solution. Distilled water is used sparingly as needed to maintain a stirrable solution.

Modifications to Recipe 4 include (i) the addition of activated carbon and (ii) the addition of zirconium oxide through dissolution of this oxide in nitric acid.

For Recipe 5 (which is an adjustment to Recipe 4), the pH of the iron precipitate was first adjusted to pH 4 prior to the separate sequential additions of crystalline silica and silicic acid.

A precipitated iron or cobalt catalyst may be prepared, as known to those of skill in the art, from various iron or cobalt acid solutions precipitated with any suitable basic hydroxide solution to a suitable pH, normally neutral. The resulting precipitate is washed till clean, the resulting cake reslurried and may be promoted with chemical and structural promoters as described herein. In embodiments, the iron precipitate to be modified according to the present disclosure is formed as described in U.S. Pat. No. 5,324,335 which is incorporated herein in its entirety for all purposes. Such precipitated iron catalyst was impregnated with alkali-silicate solutions according to Recipes 1, 2, 3 4, and 5. The names and composition of the catalysts studied are given in Table 1.

TABLE 1

Structurally Promoted Catalysts

| Catalyst | Support Recipe# | Fe | K | $SiO_2$ | Cu |
|---|---|---|---|---|---|
| FeKSi-1 | 1 | 100 | 5 | 24 | 5 |
| FeKSi-2 | 1 | 100 | 5 | 24 | 5 |
| FeKSi-3 | 1 | 100 | 2.5 | 12 | 2.5 |
| FeKSi-4 | 2 | 100 | 2.5 | 12 | 2.5 |
| FeKSi-5 | 1 | 100 | 2.5 | 12 | 2.5 |
| FeKSi-6 | 3 | 100 | 2.5 | 12 | 2.5 |
| FeKSi-7 | 3 | 100 | 5 | 24 | 5 |
| FeKSi-8 | 3 | 100 | 5 | 6 | 5 |
| FeKSi-9 | 3 | 100 | 5 | 6 | 5 |
| RI-DD-11 | 4 | 100 | 2.5 | 12 | 2.5 |
| RI-DD-12 | 4 | 100 | 2.5 | 13 | 2.5 |
| RI-DD13 | 4 | 100 | 5 | 12 | 5 |

TABLE 1-continued

Structurally Promoted Catalysts

| Catalyst | Support Recipe# | Fe | K | SiO₂ | Cu |
|---|---|---|---|---|---|
| RI-DD-15 | 4 | 100 | 5 | 12 | 5 |
| RI-DD-16 | 4 | 100 | 5 | 12 | 5 |
| RI-DD-17 | 5 | 100 | 5 | 18 | 5 |

These catalyst systems were characterized by XRD, SEM, BET area (SA), Pore Volume (PV), Pore Size (PS), Particle Size Distribution (PSD), Temperature Programmed Reduction (TPR), Air Jet Catalyst Attrition (AJCA), and Rentech Catalyst Attrition (RCA). The results are tabulated in Table 2 and discussed in the following examples. In Table 2, Prior Art catalyst comprises self-supported precipitated iron-based catalyst as described in U.S. Pat. No. 6,716,790. Unsupported Baseline Catalyst A comprises unsupported, chemically promoted (K & Cu), precipitated iron catalyst precipitated from iron nitrate and ammonium hydroxide solutions to a neutral pH. The catalyst precipitant was washed to remove all foreign species, dried and calcined at approximately 300° C.

Example 2: XRD Study

As shown in Table 2, spectra for the different samples indicated amorphous systems (with a very prominent $SiO_2$ peak), becoming crystalline on calcinations, depicting two definitive, equal sized, peaks for maghemite and hematite. Smaller peaks identifying $K_2O$ and CuO were also evident. As expected these peaks varied significantly in size depending on 6 or 24 Si/100 Fe.

Example 3: BET, PV, & PD Studies

Literature on silica indicates an increase in surface area for silica addition up to approximately 20-25% silica. Surprisingly catalyst studied here show an opposite trend. For Recipe 1 samples FeKSi-1, 2, and 3, two 24 $SiO_2$/100 Fe systems indicated BET areas of 144 and 150 m²/g respectively while a 12Si/100 Fe system gave a 234 m²/g surface area. Similarly a 12 $SiO_2$/100 Fe system prepared from Recipe 2 (FeKSi-4) indicated a 226 m²/g surface area, while a 6 $SiO_2$/100 Fe prepared with Recipe 3 (FeKSi-8) gave 237 m²/g. On calcinations, each of the mentioned catalyst showed a dramatic reduction in surface area to values between 51 and 71 m²/g.

The supported catalyst with the higher surface areas following calcination were produced using support Recipe 1 preparations for 24Si/100 Fe (FeKSi-2) and 12 Si/100 Fe (FeKSi-3) systems, yielding surface areas of 71 and 70 m²/g respectively. IARC catalyst RI-DD-17 produced using Recipe 5 exhibited a significantly higher BET surface area of 178 m²/g following calcinations. In general the surface area values are significantly higher than that for unsupported baseline catalyst A at 56 m²/g.

While the pore volumes for the supported catalysts are lower than that for the Unsupported Baseline Catalyst A (0.2116 cc/g respectively), the pore size for the supported catalyst is significantly larger (50 Å to 78 Å) than that of many unsupported baseline catalysts. IARC formed using Recipe 5 showed good sized pores at a pore volume of 0.297 cc/g.

Example 4: TPR Study

To discover if silica dissolved in the potassium created reducible catalyst species, TPR was performed, and the results are presented in Table 2. The main reduction peak temperature for Unsupported Baseline Catalyst A was determined to be 272° C. Apart from two reduction peak temperature at 237° C. (FeKSi-7) and 290° C. (FeKSi-2) for 24 Si/100 Fe containing systems the rest of the main reduction peaks are between 204° C. and 232° C., i.e. well below that for the unsupported baseline A Catalyst. It is furthermore clear from the data presented in Table 2 that reducibility is more and more inhibited with increasing silica content. Catalyst systems containing 12 Si/100 Fe had main reduction peaks in the range of 213° C. to 232° C., while systems containing only 6 Si/100 Fe showed low reduction peaks in the range of between 201° C. and 204° C.

Example 5: SEM

Figure 1E:
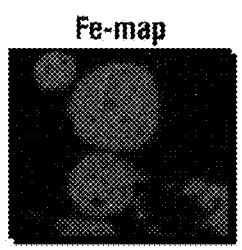
FIG. 1E is a surface Fe map of IARC particles of FeKSi-2.
Figure 1F:
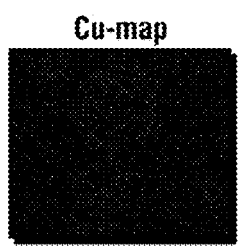
FIG. 1F is a surface Cu map of IARC particles of FeKSi-2.
Figure 1G:
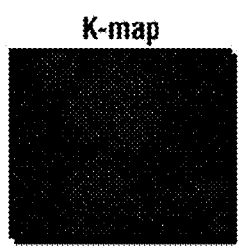
FIG. 1G is a surface K map of IARC particles of FeKSi-2.
Figure 1H:
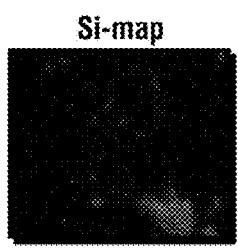
FIG. 1H is a surface Si map of IARC particles of FeKSi-2.

Initial surface morphology studies on a 24 Si/100 Fe system (FeKSi-2) prepared from support Recipe 2 are shown in FIG. 1a-1d. A good particle size distribution (PSD) with a mean of 39 micron was obtained (Table 2). While some uncalcined samples (FIG. 1c) indicated hollowness, the calcined samples (FIG. 1d) did appear more solid. Surface maps (FIGS. 1e-1g) indicate even distribution of Fe, Cu, and K species. However, silica islands surrounded by iron which may indicate inhomogeneous distribution of the product are apparent in FIG. 1h for these particles.

Recipe 4 produced smooth, substantially round, attrition resistant catalyst particles. FIGS. 2a-2d show the substantially spherical and substantially smooth surfaces of calcined (FIGS. 2b and 2d) and uncalcined (FIGS. 2a and 2c) IARC catalyst RI-DD-16.

Example 6: Spray Dry PSD Study

IARC catalysts were formed via Recipes 1-4, and spray dried. The mean particle size of the spray dried particles was in the range of from about 30 to 90 μm.

Example 7: Attrition Study

Figure 3:
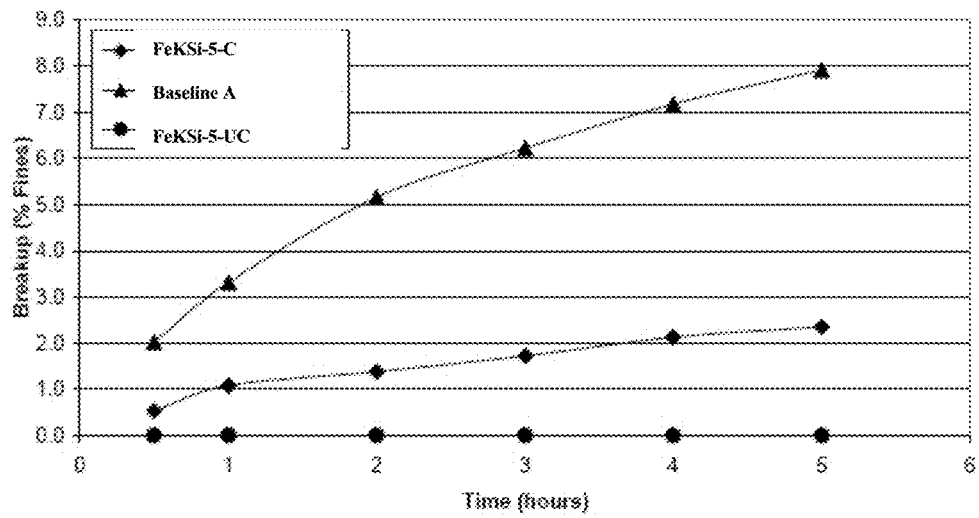
FIG. 3 is a plot showing the attrition strength, as breakup (weight percentage fines), as a function of time for calcined (FeKSi-5-C) and uncalcined (FeKSi-5-UC) IARC prepared from Recipe 1. Results for unstrengthened baseline catalyst A are shown for comparison.

Air jet attrition studies of the IARC catalysts were performed, and the results are tabulated in Table 3. FIG. 3 is a plot showing the attrition strength, as breakup (weight percentage fines), as a function of time for calcined (FeKSi-5-C) and uncalcined (FeKSi-5-UC) IARC prepared from Recipe 1. Results for unstrengthened baseline catalyst A are shown for comparison. The results in FIG. 3 indicate no breakup for FeKSi-5 catalyst prepared from Recipe 1 prior to calcinations, and less than 2.5 weight % breakup after 5 hours.

There is some indication, comparing FeKSi-2 (Recipe 1) and FeKSi-7 (Recipe 3), that for these 24 Si/100 Fe systems the catalyst system prepared with Recipe 3 is stronger. As seen in Table 3, the uncalcined Recipe 3 catalyst (FeKSi-7) shows zero attrition after 5 hours on-line, while uncalcined FeKSi-2 yields 4.0 weight % fines after 5 hours of attrition testing. On calcinations the catalyst strength deteriorated and approximately 5.1 weight % fines was collected after 5 hours of air jet attrition for both FeKSi-2 and FeKSi-7 IARCs. This is approximately 34% fewer fines than the Unsupported Baseline Catalyst A which produced 7.9 weight % fines in 5 hours of attrition testing. Three catalysts were prepared with support Recipe 3, with promoter contents 6, 12 & 24 Si/100 Fe, corresponding to IARCs FeKSi-8, FeKSi-6, and FeKSi-7, respectively. While the calcined catalyst for each of these systems indicated more break-up when compared to their uncalcined counterparts, the 6

Si/100 Fe catalyst (FeKSi-8) showed (Table 3) only 3.4% fines after 5 hours of attrition testing. The uncalcined FeKSi-8 catalyst showed 1.8% fines generation with 5 hours of attrition testing.

None of the uncalcined (UC) catalysts (FeKSi-4, -6, -7, & -8) prepared with Recipes 2 or 3, apart from the low promotion 6 Si/100 Fe system (FeKSi-8), indicated any degree of attrition (see Table 3).

Figure 4:
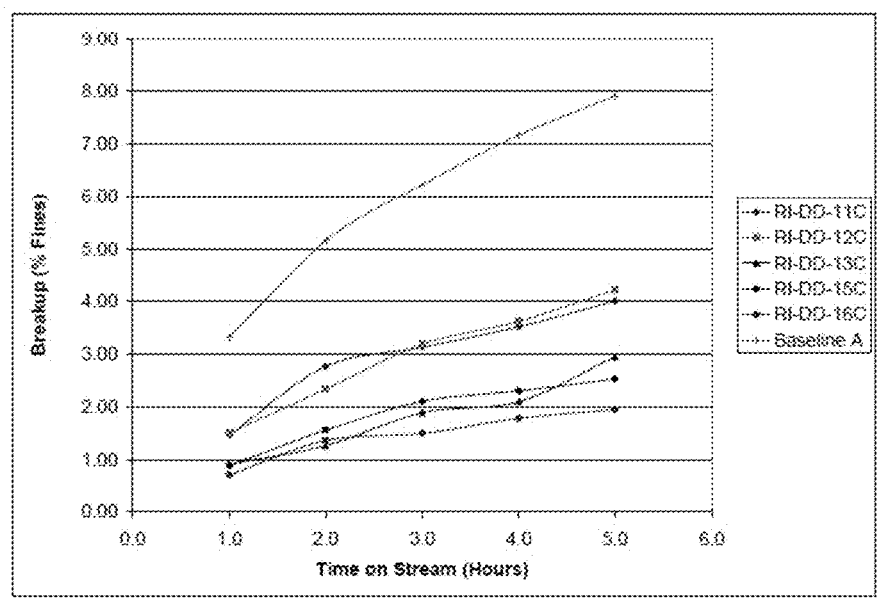
FIG. 4 is a plot showing the attrition strength, as breakup (weight percentage of fines produced), as a function of time on stream for inventive catalysts RI-DD-11C, RI-DD-12C, RI-DD-13C, RI-DD-15C, and RI-DD-16C prepared from Recipe 4. Results for unstrengthened baseline catalyst A are shown for comparison.

FIG. 4 is a plot showing the attrition strength, as breakup (weight percentage of fines produced), as a function of time on stream for inventive catalysts RI-DD-11C, RI-DD-12C, RI-DD-13C, RI-DD-15C, and RI-DD-16C prepared from Recipe 4. Results for unstrengthened baseline catalyst A are shown for comparison. The results in FIG. 4 show the relative strength of calcined supported catalyst prepared from Recipe 4, compared to an unsupported precipitated iron catalyst, Baseline A. RI-DD-16C indicated less than 2 weight % breakup after 5 hours testing. Calcined IARC catalyst RI-DD-11, comprising 2.5K:12Si:100Fe, exhibited 4.0 weight % fines after 5 hours of air jet attrition testing. IARC catalyst RI-DD-12, comprising 2.5K:13Si:100Fe exhibited 4.2 weight % fines after 5 hours of air jet attrition testing. IARCs RI-DD-13, RI-DD-15, and RI-DD-16 comprising 5K:12Si:100Fe exhibited an average of less than 2.5 weight % fines after 5 hours of air jet attrition testing.

As seen in the results presented in Table 3, IARC catalyst RI-DD-17 prepared from Recipe 5 and having a Si:100Fe greater than 12 (18 Si/100 Fe) also exhibited enhanced attrition resistance.

While preferred embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, and so forth). Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, and the like.

Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the preferred embodiments of the present invention. The disclosures of all patents, patent applications, and publications cited herein are hereby incorporated by reference, to the extent they provide exemplary, procedural or other details supplementary to those set forth herein.

TABLE 2

Catalyst Support Study

| Cat.#[g] | Support Recipe# (From Table1) | Support[a] S-75 Si/100 Fe | Base[a] (KOH) K/100Fe | XRD[d] Phase | Crystall. Size (nm) | SEM Shape | BET (m²/g) BC | BET (m²/g) AC | PV (cc/g) BC | PV (cc/g) AC |
|---|---|---|---|---|---|---|---|---|---|---|
| Prior Art Catalyst | — | ~24 | ~5 | αFe$_2$O$_3$ | — | spherical | 288 | 262 | 0.03 | 0.63 |
| Unsupported Baseline catalyst A | — | 0 | 1 | H | 27 | N/A | — | 56 | — | 0.2116 |
| FeKSi-1[b] | 1 | 24 | 5 | H | — | poor | 144 | 63 | 0.2220 | — |
| FeKSi-2[c] | 1 | 24 | 5 | H | — | poor | 150 | 71 | 0.1212 | 0.1312 |
| FeKSi-3[c] | 1 | 12 | 2.5 | H | — | poor | 234 | 70 | 0.1738 | 0.1619 |
| FeKSi-4[c] | 2 | 12 | 2.5 | H | — | poor | 226 | 53 | 0.1660 | 0.1552 |
| FeKSi-5R[c] | 1 | 12 | 2.5 | H | — | poor | 208 | 51 | 0.1411 | 0.1365 |
| FeKSi-6[c] | 3 | 12 | 2.5 | H | — | spherical | 235 | 58 | 0.1644 | 0.1552 |
| FeKSi-7[c] | 3 | 24 | 5 | H | — | spherical | 173 | 55 | 0.1286 | 0.1278 |
| FeKSi-8[c] | 3 | 6 | 2.5 | H | — | spherical | 237 | 59 | 0.1746 | 0.1601 |
| FeKSi-p[cc] | 3 | 6 | 5 | H | — | spherical | 199 | — | 0.1810 | — |
| RI-DD-11 | 4 | 12 | 2.5 | H | — | spherical | 223 | 109 | 0.2331 | 0.2459 |
| RI-DD-12 | 4 | 13 | 2.5 | H | — | spherical | 221 | 122 | 0.2188 | 0.2270 |
| RI-DD13 | 4 | 12 | 5 | H | — | spherical | 196 | 114 | 0.2130 | 0.2310 |
| RI-DD-15 | 4 | 12 | 5 | H | — | spherical | 203 | 117 | 0.2203 | 0.2281 |
| RI-DD-16 | 4 | 12 | 5 | H | — | spherical | 207 | 122 | 0.1952 | 0.2119 |
| RI-DD-17 | 5 | 18 | 5 | H | — | spherical | — | 178 | — | 0.2111 |

| Cat.#[g] | PD (A) BC | PD (A) AC | TPR (°C.) AC | PSD mean μ BC | PSD mean μ AC | AJCA % fines/5 h BC | AJCA % fines/5 h AC | RCA μ BC |
|---|---|---|---|---|---|---|---|---|
| Prior Art Catalyst | — | — | — | — | — | 11.6[e] | 3.7[e] | — |
| Unsupported Baseline catalyst A | — | 110 | 272 | — | 36 | — | 7.9 | — |

TABLE 2-continued

| Catalyst Support Study | | | | | | | | |
|---|---|---|---|---|---|---|---|---|
| FeKSi-1[b] | 33 | 96 | — | — | — | — | — | — |
| FeKSi-2[c] | 31 | 50 | 290 | 39 | — | 4.0 | 5.1 | — |
| FeKSi-3[c] | 31 | 57 | 213 | 38 | — | 1.7 | 5.3 | 64.36 |
| FeKSi-4[c] | 31 | 78 | 232 | 48 | — | 0 | 4.4 | — |
| FeKSi-5R[c] | 31 | 66 | 225 | 42 | — | 0 | 2.4 | — |
| FeKSi-6[c] | 31 | 78 | 216 | 41 | — | 0 | 6.3 | — |
| FeKSi-7[c] | 31 | 66 | 237 | 38 | — | 0 | 5.1 | — |
| FeKSi-8[c] | 31 | 66 | 207 | 39 | — | 1.8 | 3.4 | — |
| FeKSi-p[cc] | 39 | — | 204 | — | — | — | 2.9 | — |
| RI-DD-11 | 35 | 50 | 236 / 285 | 41 | | N/M | 4.0 | — |
| RI-DD-12 | 35 | 44 | 297 | 41 | | N/M | 4.2 | — |
| RI-DD13 | 35 | 44 | 251 / 274 | 46 | | N/M | 3.0 | — |
| RI-DD-15 | 35 | 44 | 256 / 286 | 44 | 44 | N/M | 2.5 | — |
| RI-DD-16 | 44 | 44 | 238 / 266 / 276 | — | 41 | N/M | 1.9 | — |
| RI-DD-17 | — | 39 | 238 / 290 | 41 | 40 | N/M | 2.7 | — |

Notes:
Copper content: Cu/100Fe = K/100Fe
BC = Before Calcination
AC = After Calcination
[a]based on catalyst preparation (not measured)
[b]Calcination: 380° C. (30° C./min., 4 h)
[c]Calcination: 380° C. (1° C./min., 4 h)
[cc]Calcination: : 300° C. (1° C./min., 4 h)
[d]Main phase (M = Maghemite; H = Hematite)
[e]Jet Impingement Study (number represents % < 22 μm) [Rest of data data represents %, 10 μm]

TABLE 3

Air Jet Attrition Break-up Data: Weight Percent Fines

| Catalyst Group | Catalyst | | Composition | Time On Stream, h | | | | | |
|---|---|---|---|---|---|---|---|---|---|
| | | | | 0.5 | 1 | 2 | 3 | 4 | 5 |
| Unsupported Baseline Catalyst A, Weight % Fines | H9-58 | | | 2.2 | 3.6 | 5.6 | 6.7 | 7.7 | 8.2 |
| | H9-62 | | | 1.9 | 3.2 | 5.1 | 6.0 | 7.1 | 7.8 |
| | H9-66 | | | 1.9 | 3.2 | 4.8 | 6.0 | 6.7 | 7.7 |
| | Average | | | 2.0 | 3.3 | 5.2 | 6.2 | 7.2 | 7.9 |
| | Std. Dev. | | | 0.196 | 0.206 | 0.401 | 0.382 | 0.518 | 0.267 |
| | Variation % | | | 9.7 | 6.2 | 7.8 | 6.1 | 7.2 | 3.4 |
| Silica-Containing Cat. Recipe 1, Wgt. % Fines | FeKSi-2 | UC | 100Fe/5Cu/5K/24Si | 1.1 | 1.3 | 2.3 | 2.8 | 3.4 | 4.0 |
| | | C | | 1.3 | 1.9 | 3.5 | 3.8 | 4.8 | 5.1 |
| | FeKSi-3 | UC | 100Fe/2.5Cu/2.5K/12Si | 0.2 | 0.2 | 0.3 | 0.3 | 0.7 | 1.7 |
| | | C | | 1.7 | 2.7 | 3.8 | 4.4 | 4.9 | 5.3 |
| | FeKSi-5 | UC | 100Fe/2.5Cu/2.5K/12Si | 0.0 | 0.0 | 0.0 | 0.0 | — | 0.0 |
| | | C | | 0.5 | 1.1 | 1.4 | 1.7 | 2.1 | 2.4 |
| Silica-Containing Cat. Recipe 2, Wgt. % Fines | FeKSi-4 | UC | 100Fe/2.5Cu/2.5K/12Si | 0.0 | 0.0 | 0.0 | 0.0 | 0.0 | 0.0 |
| | | C | | 0.9 | 1.6 | 2.5 | 3.2 | 4.0 | 4.4 |
| Silica-Containing Cat. Recipe 3, Wgt. % Fines | FeKSi-6 | UC | 100Fe/2.5Cu/2.5K/12Si | 0.0 | 0.0 | 0.0 | 0.0 | 0.0 | 0.0 |
| | | C | | 1.7 | 2.7 | 4.0 | 5.0 | 6.1 | 6.3 |
| | FeKSi-7 | UC | 100Fe/5Cu/5K/24Si | 0 | 0 | 0 | 0 | 0 | 0 |
| | | C | | 1.0 | 1.8 | 3.0 | 3.9 | 4.4 | 5.1 |
| | FeKSi-8 | UC | 100Fe/2.5Cu/2.5K/6Si | 0 | 0 | 0 | 0 | 0.9 | 1.8 |
| | | C | | 0.8 | 1.6 | 2.1 | 2.9 | 2.9 | 3.4 |
| Silica-Containing Cat. Recipe 4, Wgt. % Fines | RI-DD-11 | C | 100Fe/2.5Cu/2.5K/12Si | — | 1.5 | 2.8 | 3.1 | 3.5 | 4.0 |
| | RI-DD-12 | C | 100Fe/2.5Cu/2.5K/13Si | — | 1.5 | 2.3 | 3.2 | 3.6 | 4.2 |
| | RI-DD-13 | C | 100Fe/5Cu/5K/12Si | — | 0.9 | 1.3 | 1.9 | 2.1 | 3.0 |
| | RI-DD-15 | C | 100Fe/5Cu/5K/12Si | — | 0.9 | 1.6 | 2.1 | 2.3 | 2.5 |
| | RI-DD-16 | C | 100Fe/5Cu/5K/12Si | — | 0.7 | 1.4 | 1.5 | 1.8 | 1.9 |
| Silica-Containing Cat. Recipe 5, Wgt. % Fines | RI-DD-17 | C | 100Fe/5Cu/5K/18Si | — | 1.1 | 1.5 | 1.9 | 2.3 | 2.7 |

What is claimed is:

1. A structurally promoted precipitated catalyst comprising:
   crystalline silica;
   at least one chemical promoter selected from the group consisting of alkali metals; and
   iron;
   wherein the structurally promoted precipitated catalyst comprises maghemite and hematite catalytic phases, and wherein the structurally promoted precipitated catalyst has a main reduction peak temperature, as determined by TPR, in the range of from about 210° C. to about 350° C.; and wherein the structurally promoted precipitated catalyst comprises a substantially homogeneous distribution of iron and alkali metal due to production thereof via impregnation of a precipitated iron catalyst slurry with an alkali-silicate support solution consisting essentially of:
   crystalline silica dissolved in an aqueous solution comprising at least one chemical promoter selected from the group consisting of alkali metal bases.

2. The structurally promoted precipitated catalyst of claim 1, wherein the alkali-silicate support solution has a pH of greater than or equal to about 7.

3. The structurally promoted precipitated catalyst of claim 1, wherein the chemical promoter comprises an alkali hydroxide.

4. The structurally promoted precipitated catalyst of claim 3, wherein the chemical promoter is selected from the group consisting of sodium hydroxide, potassium hydroxide, and combinations thereof.

5. The structurally promoted precipitated catalyst of claim 4, wherein the chemical promoter comprises potassium hydroxide.

6. The structurally promoted precipitated catalyst of claim 1, wherein the alkali-silicate support solution further comprises a structural support selected from the group consisting of boehmite, amorphous silica, silicic acid, tetraethyl orthosilicate, alumina, $MgAl_2O_4$ and combinations thereof.

7. The structurally promoted precipitated catalyst of claim 1, wherein the alkali-silicate support solution comprises no significant concentration of salt.

8. The structurally promoted precipitated catalyst of claim 1 comprising $SiO_2$:Fe in a weight ratio of from about 2:100 to about 24:100.

9. The structurally promoted precipitated catalyst of claim 8 further comprising copper.

10. The structurally promoted precipitated catalyst of claim 9, wherein the catalyst comprises a weight ratio of Cu:Fe in the range of from 1:100 to about 10:100.

11. The structurally promoted precipitated catalyst of claim 10, wherein the catalyst comprises K:Fe in a weight ratio of from about 1:100 to about 10:100.

12. The structurally promoted precipitated catalyst of claim 1 having an ASTM air jet attrition resistance such that less than about 5 wt % fines are produced within a testing duration of 5 hours.

13. The structurally promoted precipitated catalyst of claim 12, wherein less than 1 wt % fines are produced within a testing duration of 5 hours.

14. The structurally promoted precipitated catalyst of claim 1, wherein the catalyst catalyzes Fischer-Tropsch synthesis.

15. The structurally promoted precipitated catalyst of claim 1 having a main reduction peak temperature, as determined by TPR, in the range of from about 210° C. to about 280° C.

16. The structurally promoted precipitated catalyst of claim 1 comprising substantially no iron silicates.

17. The structurally promoted precipitated catalyst of claim 1 exhibiting substantially equivalent x-ray diffraction peaks for maghemite and hematite.

* * * * *